Figure 1:
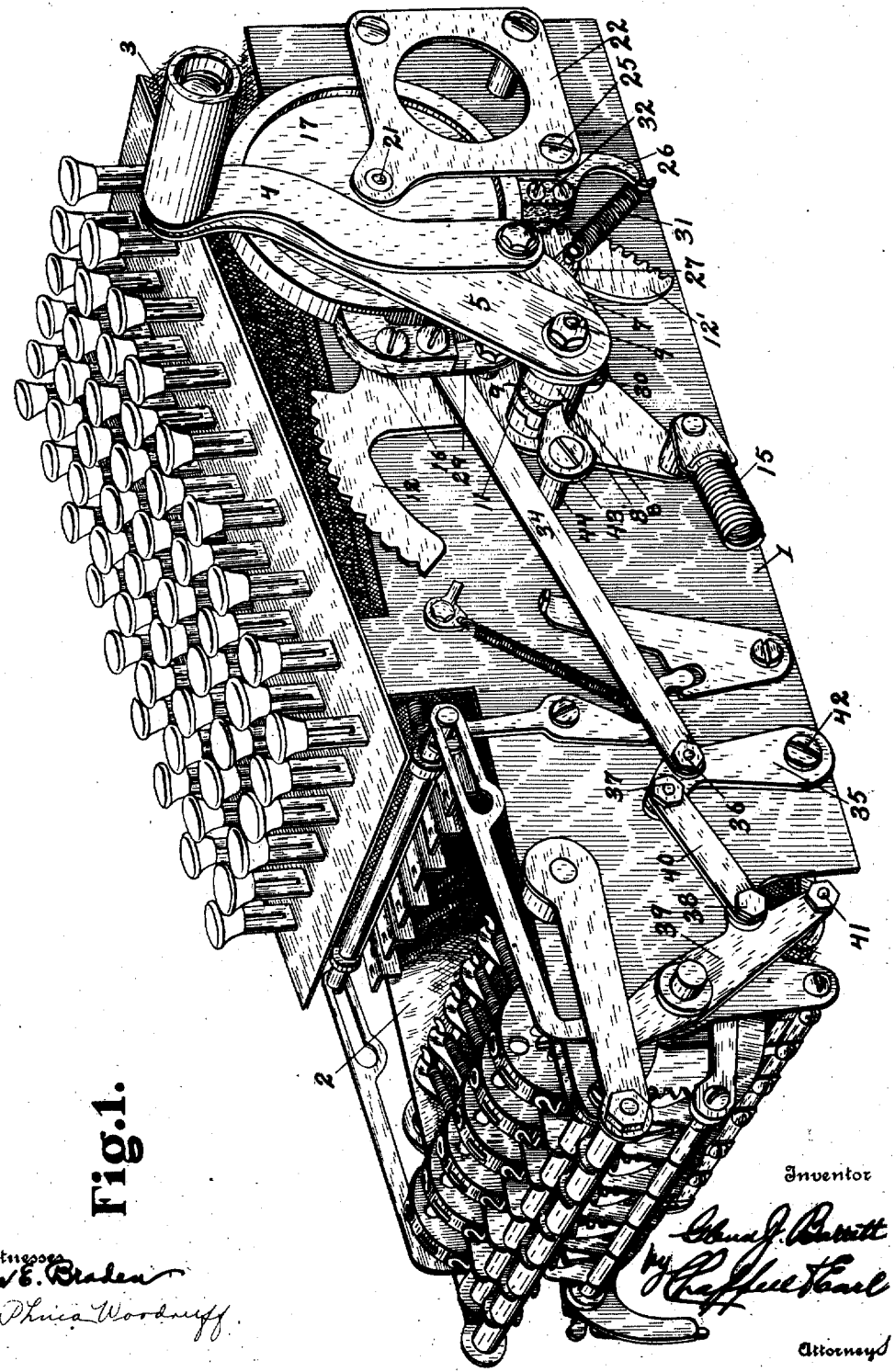

G. J. BARRETT.
ACTUATING DEVICE FOR KEY SET CALCULATING MACHINES.
APPLICATION FILED JUNE 7, 1910.

1,000,363.

Patented Aug. 15, 1911.
7 SHEETS—SHEET 1.

G. J. BARRETT.
ACTUATING DEVICE FOR KEY SET CALCULATING MACHINES.
APPLICATION FILED JUNE 7, 1910.

1,000,363. Patented Aug. 15, 1911.
7 SHEETS—SHEET 2.

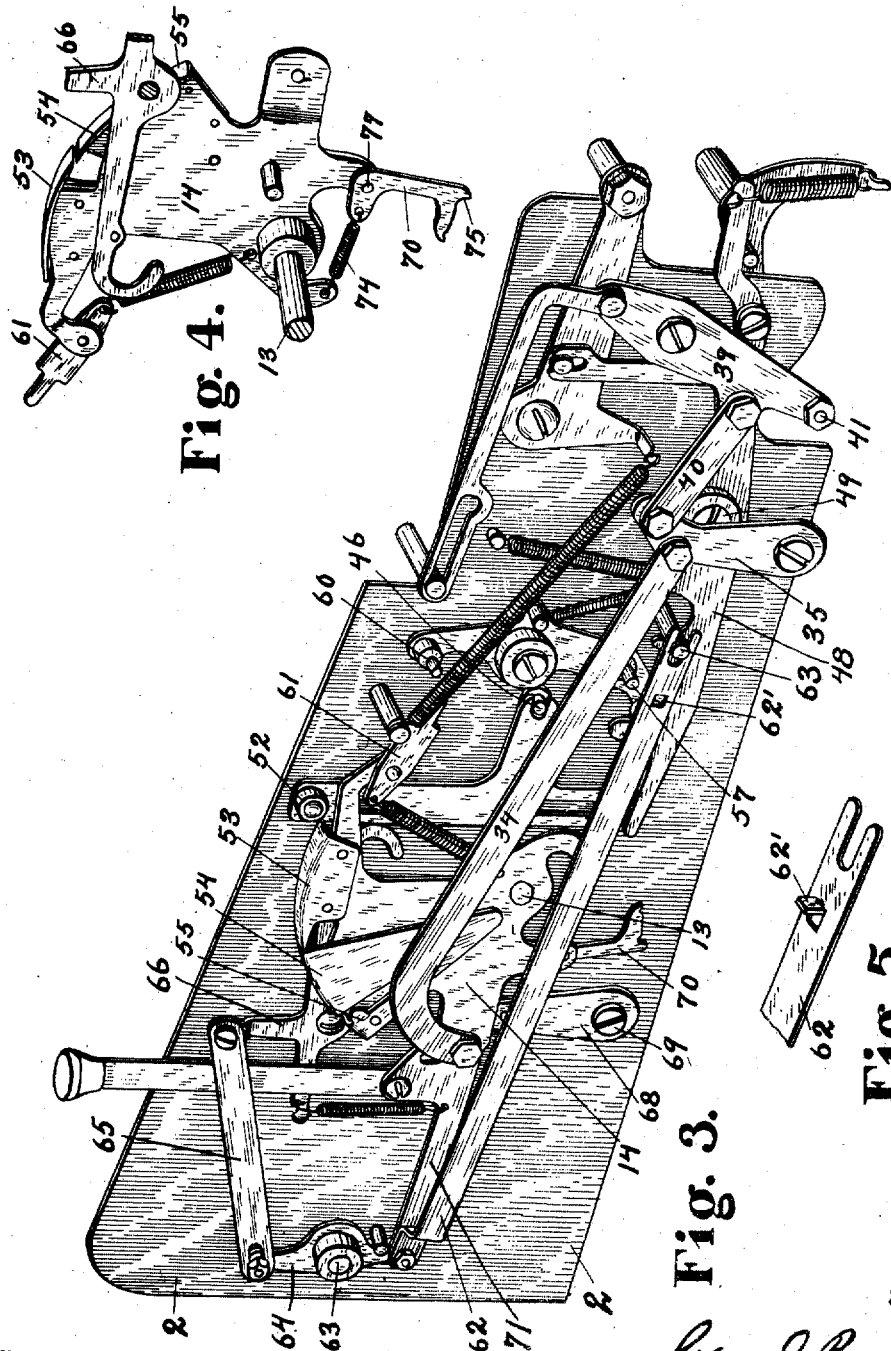

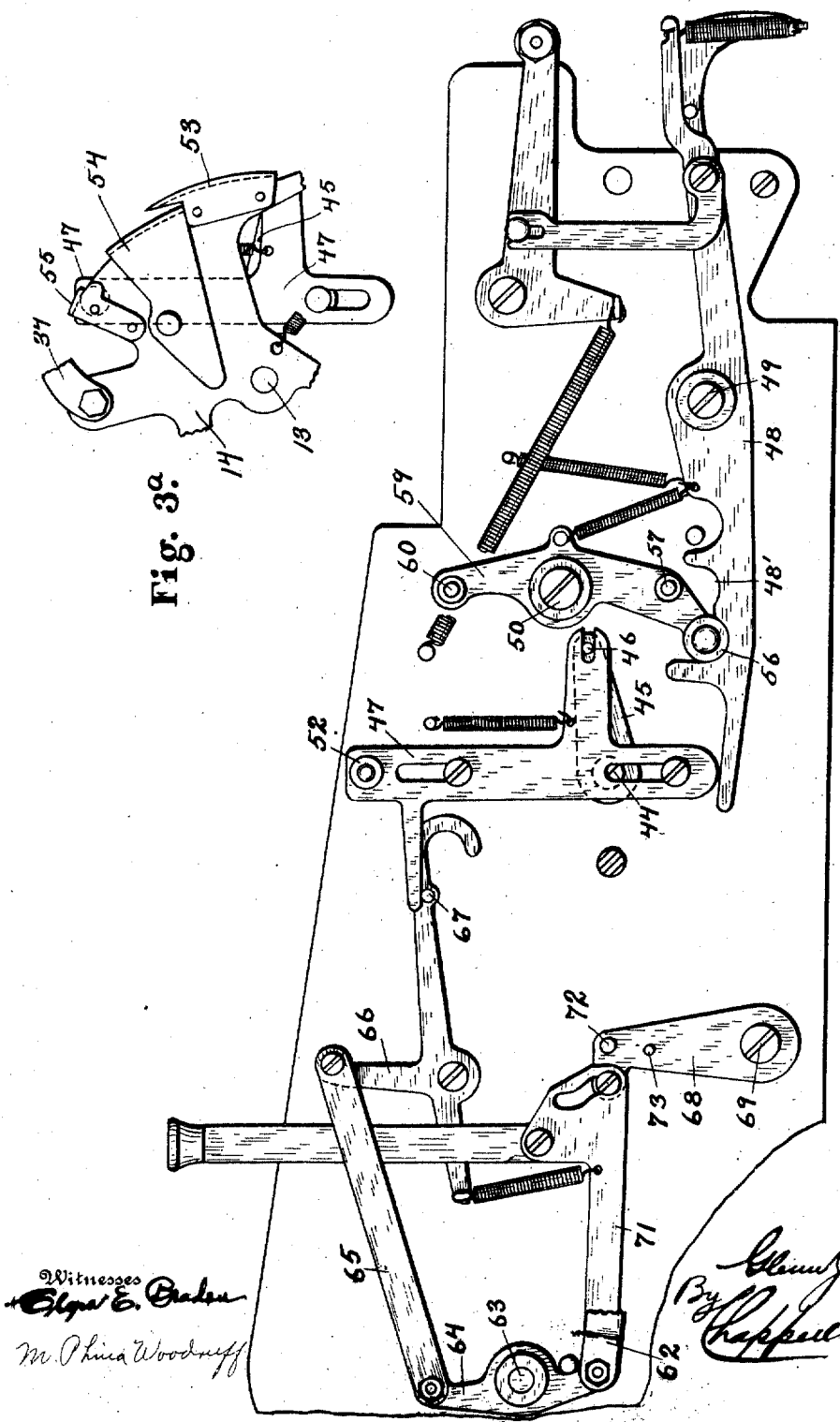

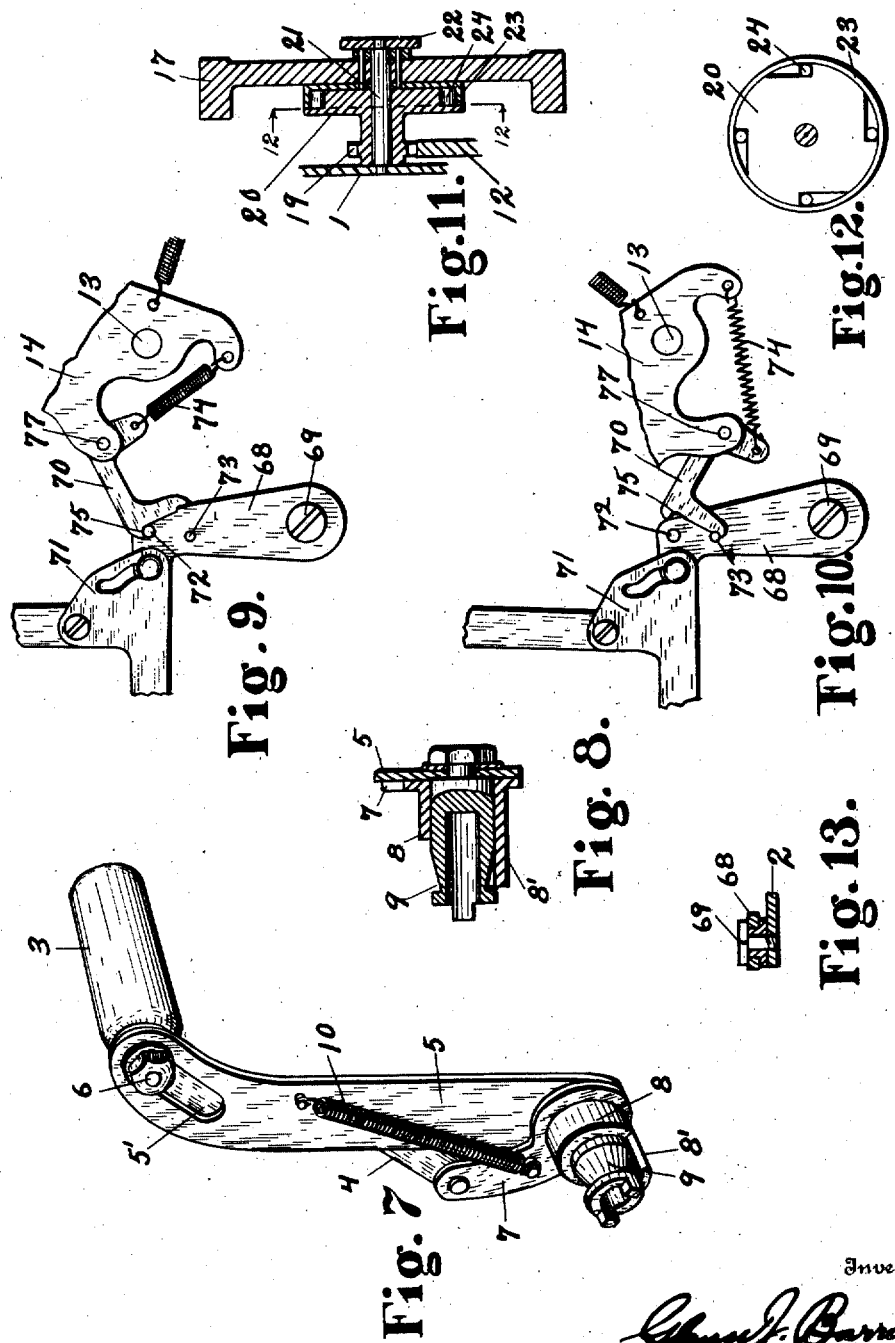

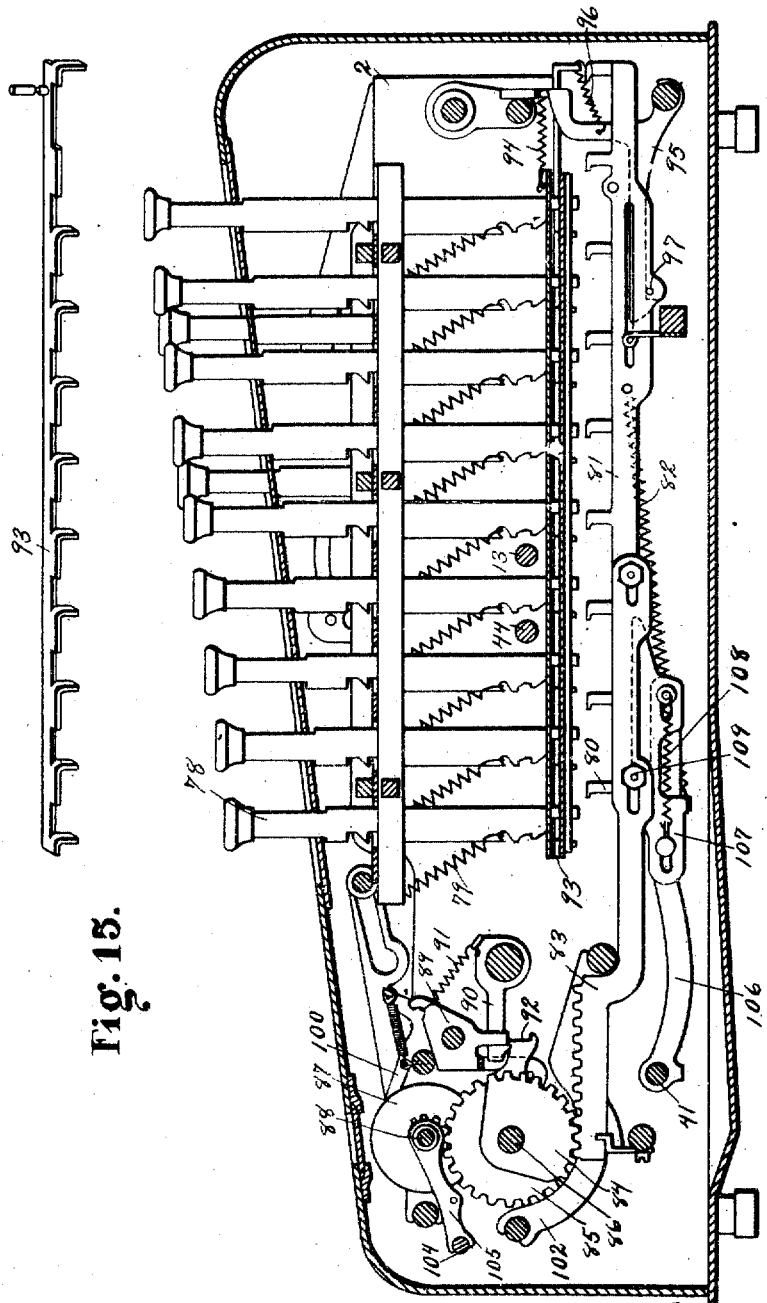

G. J. BARRETT.
ACTUATING DEVICE FOR KEY SET CALCULATING MACHINES.
APPLICATION FILED JUNE 7, 1910.
1,000,363.
Patented Aug. 15, 1911.
7 SHEETS—SHEET 7.
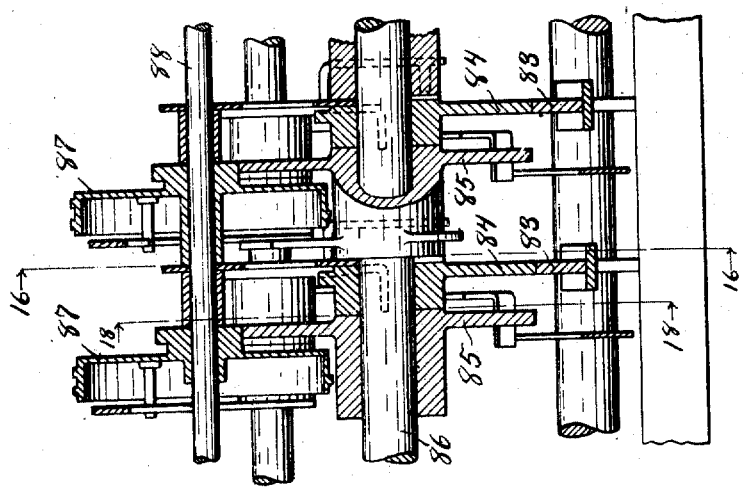
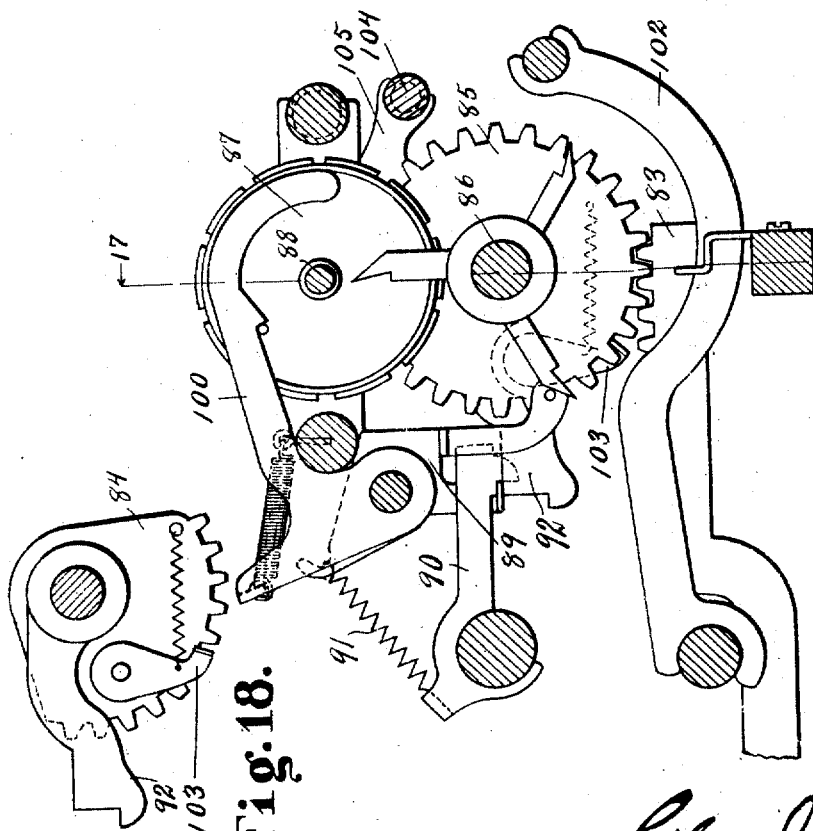

UNITED STATES PATENT OFFICE.

GLENN J. BARRETT, OF GRAND RAPIDS, MICHIGAN, ASSIGNOR, BY DIRECT AND MESNE ASSIGNMENTS, TO BARRETT ADDING MACHINE CO., OF GRAND RAPIDS, MICHIGAN, A CORPORATION.

ACTUATING DEVICE FOR KEY-SET CALCULATING-MACHINES.

1,000,363.  Specification of Letters Patent.  Patented Aug. 15, 1911.

Application filed June 7, 1910. Serial No. 565,561.

*To all whom it may concern:*

Be it known that I, GLENN J. BARRETT, a citizen of the United States, residing at Grand Rapids, Kent county, Michigan, have invented certain new and useful Improvements in Actuating Devices for Key-Set Calculating-Machines, of which the following is a specification.

This invention relates to improvements in actuating devices for key-set calculating machines.

The principal objects of this invention are: First, to provide an actuating handle, which shall act as a key releasing means, and also render a special dial clearing button, key or lever, unnecessary. Second, to provide a rotary brake means to cushion the return of the actuating handle. Third, to provide means for checking the rotation of said brake means during the forward movement of said handle. Fourth, to provide means for imparting to the "pick-up bail" or device for restoring the dial actuating members to normal position, a movement having its greatest speed at a point midway between normal position and extreme position away from normal, and during a constant movement of said handle. Fifth, to provide means for "clearing" the dials controlled entirely by the actuating handle. Sixth, to provide an actuating means for operating the key releasing means, controlled by the movement of the actuating handle which will render the latching of said keys inoperative until the actuating handle nears its normal position, and with a minimum of friction. Seventh, to provide means, during the "clearing" operation, for disengaging the dial actuating members as the actuating handle starts in its return movement.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

Figure 2:
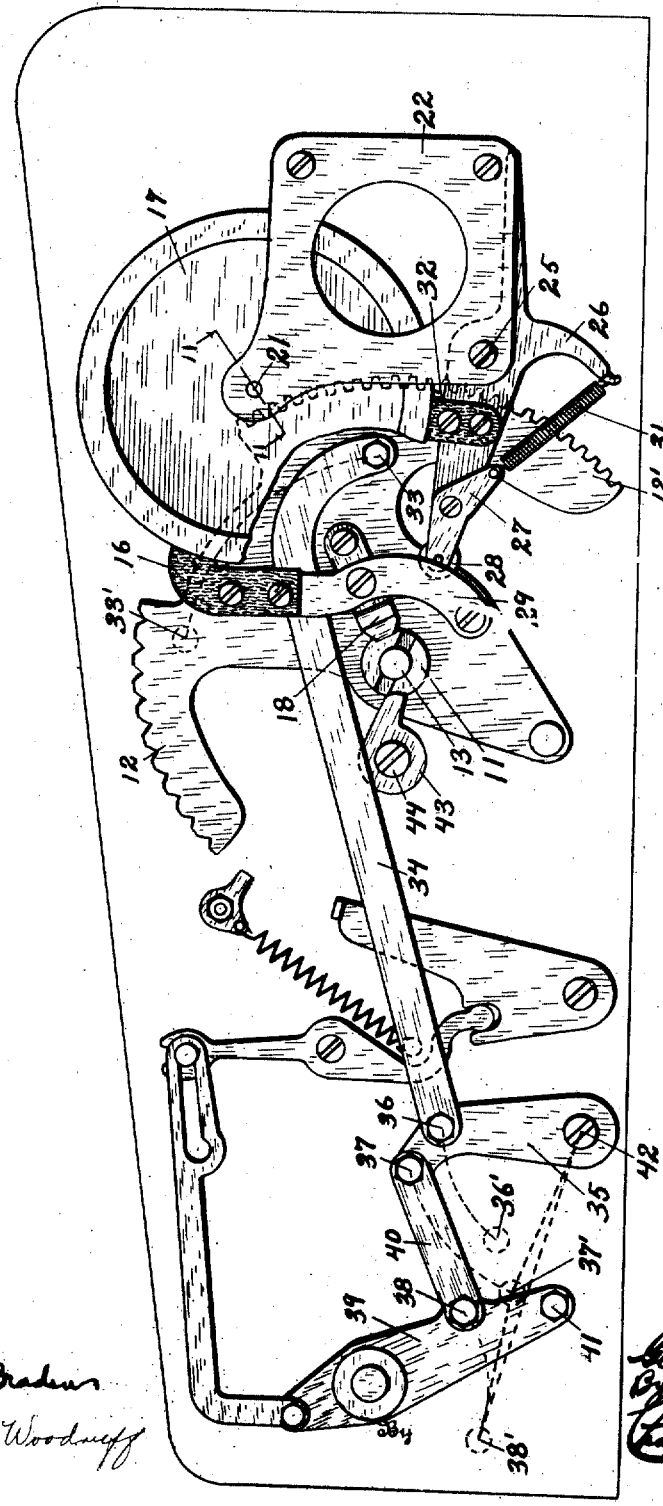

A structure constituting an effective and preferred embodiment of the features of my invention is clearly illustrated in the accompanying drawing, forming a part of this specification, in which:

Figure 1 is a perspective view of a calculating machine embodying the features of my invention taken from the right hand or handle side, the casing being omitted. Fig. 2 is a right hand elevation of the structure appearing in Fig. 1, the handle and certain other parts being omitted. Fig. 3 is a detail perspective view of the mechanism appearing on the left hand side of the case illustrated in Fig. 1. Fig. 3$^A$ is a detail view of the segment separated from the machine. Fig. 4 is a perspective view of the interior portion of the actuating segment detached from the left hand side of the machine. Fig. 5 is a detail perspective view of the end of bar 62. Fig. 6 is a detail elevation view of the structure illustrated in Fig. 3, with the segment and certain parts omitted. Fig. 7 is a detail perspective view of the interior part of the actuating handle and its actuating parts. Fig. 8 is a detail sectional view through the crank spindles, taken on a line corresponding to line 8—8 of Fig. 7. Figs. 9 and 10 are detail views showing the operation of certain portions of the actuating mechanism. Fig. 11 is an enlarged detail sectional view on line 11—11 of Fig. 2, showing details of the brake mechanism. Fig. 12 is a detail sectional view on line 12—12 of Fig. 11. Fig. 13 is a detail sectional view on line 13—13 of Figs. 9 and 10. Fig. 14 is a detail vertical sectional view from front to rear through the main body of an adding machine embodying the features of my invention. Fig. 15 is an enlarged detail perspective view of a key-stem releasing slide. Fig. 16 is an enlarged detail sectional elevation through the dial and transfer mechanism, the casing and other parts being omitted or broken away, the same being taken on a line corresponding to line 16—16 of Fig. 17. Fig. 17 is an enlarged detail sectional view, partially in full line, taken on a line corresponding to line 17—17 of Fig. 16, showing details of the transfer and dial mechanism. Fig. 18 is an enlarged detail view, taken on line 18—18 of Fig. 17, showing the actuating sector and spring pawl thereon.

In the drawings, all of the sectional views are taken looking in the direction of the little arrows at the ends of the section lines, and similar numerals of reference refer to similar parts throughout the several views.

I have shown my actuating devices applied to a key-set form of calculating machine. The method of actuating the dials is immaterial to my invention. The mechanisms in general between the two side plates 1 and 2 may be in any form well known in the key set adding machine art. It will be understood that such mechanisms include means for latching the keys in depressed positions; means for unlatching the same during the operation of the handle; an actuating means for rotating the dials, the movement of which is controlled or limited by the respective keys of the key-board; means for disengaging the dials with said dial actuating means during the movement of the latter away from normal position, and means for maintaining said dial actuating means in engaged relation to said dials during the return of the former toward normal position; and also a detent means for engaging the dials against rotation while the latter are disengaged from the dial actuating means. The form of these various mechanisms, is not material to my invention, the devices for all of which purposes being well known.

In the mechanism herein shown to which I have adapted my invention, the accumulating mechanism together with the key-setting mechanism are materially like those disclosed in my Patent No. 976,336, issued to me November 22, 1910. Briefly described, 78 are depressible key stems, which, when depressed, interpose stops in the path of travel of reciprocating members 81. 80 are the stops coöperating with the engaging portions of said key stems. 93 is a releasing slide which serves to release the depressed key stems during the operation of the handle in a manner disclosed in said Patent No. 976,336. Said slides are also given a rearward movement upon the depression of the key stem coöperating therewith, which rearward movement elevates the catch 95 out of engaging relation with the pin 97 in the slide 87, so that when the handle is operated the particular slide whose catch is thus elevated, may go forward until engaged and stopped by the depressed key stems coöperating with said slide. The bail arm 39 carrying the bail 41 swings on the pivoted point 86 during the operation of the handle. The connection between said bail 41 and the slide may be traced through the parts 106 and 107, 107 being carried by 106 and having a sliding movement thereon against the tension of the spring 108. 107 contacts with the slide 81 at the point 109. During the forward movement of 41, 81 is drawn forward by virtue of the spring connecting 82 between 81, and 107, all of which movements are clearly described in my said Patent No. 976,336. The form of the accumulating dial section shown herewith is also in general like the corresponding sections shown in my said Patent No. 976,336. The connection between the reciprocating sliding members 81 and said dials, may be traced through the parts 83, 84, 103, 85 and the dials 87. The reciprocating members actuate said dials by virtue of said connections. The movement of 48 as described locks and unlocks the dials with their respective actuators, this locking being accomplished by elevating the locking members 102 which locks the pawl 103 into the dial driving gear 85; and the unlocking is accomplished by the reverse movement of 102, this locking and unlocking constituting an engaging and disengaging of the dials from their actuators. It will be understood that during resetting of the dials to the "0" that the members 102 will be held in locking position with reference to pawl 103 until after dials are rotated backwardly to said "0" point and then afterward dropped to unlocking position. The exact form of said dial and actuating mechanism is immaterial to my invention, but a full description of the structure which I have shown in connection therewith may be had by reference to said Patent No. 976,336.

Fig. 1 shows a perspective view of the right side of a calculating machine embodying my invention. The handle piece 3 is mounted upon the sliding arm 4, which is held in position as shown by means of an extension of the bearing 6 for the handle 3, through a slot 5' in the main arm 5. The lower portion of this sliding arm 4 is pivotally attached to the auxiliary crank arm 7 on the sleeve 8 and is adapted to rock on the hub 9 which is rigidly attached to the arm 5. Details of this construction will be readily seen in Fig. 7. A spring 10 connects the auxiliary arm 7 to the main arm 5 and holds the parts in normal positions. This hub 9 fits into the bushing 11 in the main driving sector 12, which is rigidly secured to the shaft 13. (See Fig. 2). This shaft extends through the machine and carries upon the left side thereof the secondary sector 14 and connected parts.

The main spring 15 is attached to the main sector 12 and to some convenient point upon the forward portion of the frame. A leather buffer 16 mounted upon sector 12 limits the rearward movement of the main sector 12, as the former abuts the periphery of the rotary brake 17. A sheet metal spring 18 engages the hub 9 and holds the actuating handle in position.

Upon one portion of the main sector 12 are gear teeth 12' which coöperate with the pinion 19, (Fig. 11), which pinion carries upon its other end the brake clutch 20. (See Fig. 12). This pinion is loosely mounted upon the shaft 21 which is rigidly secured to the rotary brake wheel 17, and is pivoted in the plate 22 and also in the side 1. Carried by this rotary brake wheel 17 is the clutch cup 23 within which are clutch rollers 24 to engage the clutch member 20. By reference to Figs. 11 and 12, it will be readily understood that when the pinion 19 and clutch member 20 rotate in one direction, the rollers 24 become inoperative, and when said pinion rotates in the opposite direction, the rollers grip between the clutch member 20 and the cup 23 forcing the brake wheel to revolve with them. Thus, when the actuating handle is drawn forwardly, the rotary brake wheel remains stationary, but begins to rotate as the handle recedes toward normal position. If it were not for this brake, the force of the spring 15 would cause a disagreeable jar, which in time might be injurious to the machine, besides being a distinct annoyance at all times.

Pivoted upon one of the supports 25 for the plate 22 is the arm 26 carrying the bent lever 27 which in turn carries the roller 28. This roller lies in the space between lever 29 and the main sector 12. A leather brake shoe 16 is carried by the lever 29. In Fig. 1, a separating collar 30 is between the lever 29 and sector 12. This separating collar 30 is adapted to strike the roller 28 as the handle is drawn forwardly. This causes the bent lever 27 to swing against the tension of spring 31, (see Fig. 2). A piece of leather 32 is carried by the arm 26 and is normally adapted to be free from the periphery of the rotary brake 17. When the main sector swings forwardly, and the collar 30 strikes the roller 28, the leather 32 is pressed against the rotary brake 17 and if same happens to be rotating, its motion is checked and it comes to a position of rest before the handle starts upon its return movement. In the rapid operation of the machine, for instance in multiplying, the abutting of the buffer 16 against this rotary brake is not sufficient to wholly check its movement, and the function of the leather 32 is to completely check the brake 17.

Attached to the main sector 12 at 33 is the main pitman 34. This, in turn, is pivoted to the arm 35 at 36. The arm 35 is pivotally mounted upon the side plate 1 at 42. At 37 is pivotally attached the connecting link 40, the other end of which is attached to the pick-up arm 39 at 38. The functions of these arms fully appear in my former patent, see Fig. 3, where a bail 325 is carried by arms 350.

41 is the pick-up bail which has a reciprocatory movement and whose function is to pick up the dial actuating members and restore them to normal positions during the return movement of the actuating handle, a common feature in these adding machines. It will be noted that the points 33, 13 and 36 are about in line, so that the movement of the arm 35, as pivot 33 nears the position shown, is but very slight (see full and dotted lines Fig. 2). When the handle reaches the limit of its forward movement, the pivot point 33 advances to the position 33' indicated by the dotted lines. Naturally, the pitman at the point 36 advances toward the front of the machine very rapidly as the handle reaches the end of its forward movement. At this time, point 36 takes the position of 36', and 37 the position of 37'. Pivot 38 then assumes the position of 38', and it will be readily seen when the parts are in these positions that 37' is nearly in line with pivot 42 and 38'. In other words, the movement of the bail 41 is comparatively slow, when the handle starts, and increases in speed as the handle proceeds, and then slackens its speed as said bail 41 approaches the limit of its forward movement. This is a very desirable feature, as is well understood in the adding machine art, and the result is accomplished with a minimum of friction. This properly times the movements to secure the best action and completes the movement with a maximum of power and minimum of speed, which lessens the tendency to overthrow.

Corresponding parts to 34, 35, 40, 39 and 41 will be noted on the left side of the machine, this rendering unnecessary a rigid vibratory frame formed of the parts 39 and 41.

44 is a shaft extending through the machine parallel to the shaft 13. Upon the right end of this shaft is carried the lifting arm 43. When the operating handle is placed in working position, as shown in Fig. 1, the finger 8' of the sleeve 8 comes under the forward portion of this lifting arm 43. When this sleeve is rocked on the hub 9, this finger 8' abuts the lifting arm 43, and causes the shaft 44 to rock.

Upon the left side of the machine (see Fig. 6), and upon the left end of the shaft 44 is the arm 45 with the pin 46 in a slot of the vertical sliding member 47. When the operation just described takes place, this slide is forced downwardly, which in turn moves the lever 48. The function of this lever 48 will be understood to engage and disengage the dials from their actuating members, a common feature of machines of this class. The manner in which this is accomplished is not material to my invention. It will further be understood that when the rear portion of this lever 48 is depressed, as described, the dials become locked with their respective actuating members by any suitable means.

When the slide 47 is moved downwardly, the roller 52 is in such position that the plate 53 passes over instead of under said roller, as the secondary sector 14 swings forwardly during the operation of the actuating handle. Pivotally mounted upon sector 14 at 54′ is the swinging plate 54. When in the position shown in Fig. 5, this swinging plate 54 forms with 53 a continuous track for the roller 52, as immediately after drawing forward the handle when parts are in this position and slide 47 depressed, the lifting arm 43 is released and, of course, the tension of the various springs and weight of parts cause the roller to run upon the under side of these parts 53 and 54.

After the member 14 is swung forwardly far enough, the fixed plate 55 engages the roller in the position shown in Fig. 3ᴬ. When this happens, the swinging plate 54 is released and drops to the position shown in Fig. 3ᴬ. Immediately, as sector 14 starts upon its rearward movement, the roller is released from the plate 55 and rises up between the plate 55 and the plate 54 to the position shown in Fig. 3. This, in turn, will be understood to disengage the dials from their actuators before the pick-up bail starts to pick up said actuators to restore them to normal positions.

As stated, the dials are engaged and disengaged from their actuators, a common feature in adding machines, by the rocking of the lever 48 upon the pivotal point 49. This is fully described in detail in my said former patent. This lever is actuated by the movement of the roller 56 as it coöperates with the cam 48′. A lever 59 pivotally mounted at 58 carries said roller 56, and upon this lever are the contact pins 57 and 60. A double acting pawl 61 mounted upon the secondary sector 14 (see Fig. 3), is adapted to engage the pin 60 upon the forward movement of the sector 14. This throws the lever 59 into position shown in Fig. 6, which, it will be understood, by reason of the coöperation with the cam 48′ on the lever 48, disengages the dials from their actuating members. When the said secondary sector 14 reaches the forward limit of its movement, the under portion of said pawl 61 engages the pin 57 in such a manner that the beginning of the return movement of said secondary sector 14 causes said roller 56 to force the rear portion of said lever 48 downwardly, which will be understood reëngages said dials with their actuating members.

62 is a bar having an inwardly-extending projection 62′, whose function is to prevent the pawl 61 from engaging the pin 57, as previously described, when it is desired to clear the machine. By reason of the connections from the slide 47 to this sliding member 62, which may be traced through the pin 67, the bell crank 66, the link 65, and the lever 64 pivotally mounted at 63, when the slide is depressed when clearing the dials, this bar 62 is forced rearwardly upon the grooved pin 53, which it embraces by a slot at the end, (see Figs. 3 and 5). This movement brings the ear of the projection 62′ on said bar into the path of travel of the pawl 61 at the point in the movement of the latter when it would normally be in position to engage the pin 57. The point upon the under side of said pawl 61 where said projection 62′ contacts with said pawl, is slightly forward of the pivotal point of said pawl 61 upon the secondary sector 14, which tilts said pawl upwardly to such an extent that the engaging portion thereof is free and clear of the pin 57; and so it will be readily seen that while said slide 47 is depressed during the operation of clearing the dials, said pawl cannot cause said dials to become reëngaged with their actuating members, after having been freed therefrom by the upward movement of said slide 47 previously explained.

In general, the operation of the clearing actuating mechanism previously described is as follows: When it is desired to return the dials to the "0" point, in other words, clear the machine, before drawing the handle forward, and instead of depressing a clearing key as is usually necessary in machines of this class, the handle finger piece 3 is depressed toward the base of the machine. This movement first releases any keys in the key board which may happen to have been previously depressed, and also releases the dial actuating members so that the same may go forward, as will be explained hereinafter. These operations are fully described in my said former patent. By reason of the connections through the machine by means of the shaft 44 to the operating parts on the left side thereof, when the handle is in this depressed position and drawn forward, the dials are held in engaged relation to their actuating members by reason of the contact between the slide 47 and the lever 48. The dial actuators having been released and drawn forwardly during the forward movement of the handle under this condition, and being engaged with the dials, will rotate the dials backwardly to the "0" point, it being understood that there is a stop for preventing the backward rotation of said dials beyond said "0" point, as is common in machines of this class. The dials and actuators remain at this point during the further movement of the handle, and while the roller 52 is riding along on the under side of the plates 53, 54, and 55 to the position shown in Fig. 3ᴬ. Then during the early part of the return movement of said handle, the roller passes up through the space between the plate 55 and the roller 52, which movement disengages the dial actuators from the dials. Then during the movement of said handle toward normal position, it restores the dial actuators to normal position, while the same are disengaged from said dials, by reason of the projection 62' preventing the pawl 61 from normally cooperating with said pin 57.

As stated, it will be understood that between the sides 1 and 2, there is mechanism for releasing the keys from depressed positions. It will be further understood that the rocking of the shaft 63, the pivotal point of the lever 64, actuates said key releasing mechanism, the details of the latter being immaterial to my invention.

It will also be understood, that in common with other machines of its class, this machine shown in connection with my invention has a means of releasing the dial actuators when clearing the machine so that said actuators may go forward during the operation of the handle, there being no key in the key board to be depressed. Normally, the depression of any key in any column, releases the dial actuator of that particular column, as will be readily understood by those familiar with the adding machine art as applied to machines of the class shown herewith. This releasing means for the purpose of "clearing" is also controlled by the rocking of said shaft 63.

Thus it will be readily understood that by tracing the mechanisms already described, that the depression of the handle finger piece will release the depressed finger keys. The advantages of this combination with an operating handle and a key release are particularly pointed out. First, as a matter of convenience to the operator, it not being necessary either to use the left hand, for the purpose of releasing the keys, nor to move the right from its accustomed position in operating said handle. Then again, it affords an automatic means of releasing the keys of the key board, before the clearing operation. Ordinarily in machines of the class shown, if keys be depressed in the key board of the machine, it will be impossible to clear the machine owing to safety interlocking devices provided, and hence is necessary first to release the depressed keys before the clearing operation is possible. The handle finger piece in this invention is utilized to both release the depressed finger piece, and to position parts preparatory to clearing the dials during the forward handle strokes.

The machine shown herewith in common with other machines of its class has automatic means of releasing the finger keys during the return of the operating handle. The actuating mechanism for accomplishing this and embracing a portion of my invention may be seen particularly by reference to Figs. 3, 9 and 10. The particular object of my invention in this regard is to provide means for holding the key release operative until the dial actuators have nearly returned to normal position, so that if the keys be depressed during the return movement of the handle it will be impossible to latch it in depressed position while the actuators are being restored, which might possibly interfere with the proper operation of the machine. It is generally customary to lock the keys against depression until the handle reaches a point in its return movement where a key depression would be safe. My invention, in this regard, has as one of its objects rendering such locking mechanisms unnecessary. This object is accomplished by means of the pawl 70 pivotally mounted upon the secondary sector 14, and adapted to swing either way thereon and held in normal position shown in Fig. 9, by the spring 74. This pawl has two engaging portions 75 and 76. During the return movement of sector 14, engaging notch 75 engages pin 72 on the pivoted arm 68 and a further movement of said sector 14 toward normal position forces said arm rearwardly, and by reason of the link 71, causes the shaft 63 to rotate, releasing the keys. Then just as the center 77 passes the line between 72 and 13, the other engaging portion 76 of the pawl 70 engages the pin 73, which prevents the return of the arm 68 to normal position until just before sector 14 reaches normal position. This also gives a pause to the releasing mechanism, so that in rapid work it would be impossible to release the keys and allow the latter to become latched again before they would have time to return to normal position. The arm 68 is pivotally mounted upon the side 2, the details of which are shown in Fig. 13.

Having thus described my invention, what I claim as new and desire to secure by Letters Patent, is:

1. In an adding machine of the class described, having a key releasing means and a dial resetting means, the combination of operating means comprising an operating arm 5 having the slot 5' at its upward extremity, the sliding member 4 carrying the finger piece 3 pivotally mounted upon the stud 6 rigidly secured to said slide 4 and extending through said slot 5' in said arm 5, a spring for holding said sliding member in normal position, a hub rigidly secured to said operating arm having engaging portions and an annular groove, an operating shaft adapted to fit said hub, a slotted member attached to said operating shaft adapted to receive said projections from said hub, a detent spring to coöperate with said annular groove in said hub, a sleeve having a projecting finger rotatably mounted upon said hub, an arm rigidly secured to said sleeve, pivotal connections between said rigidly secured arm and said sliding member, a shaft extending transversely through said adding machine, an arm rigidly secured to said shaft and adapted to be abutted by said finger on said sleeve, connections between said transversely extending shaft, and said key releasing means, and connections between said transversely extending shaft, and said dial resetting means, substantially as described.

2. In an adding machine of the class described having a key releasing means and a dial resetting means; the combination of an operating means comprising an operating arm having a slot at one extremity, a sliding member carrying a finger piece pivotally mounted upon a suitable stud rigidly secured to said slide, and extending through said slot in said arm, a spring for holding said sliding member in normal position, a hub rigidly secured to said arm having engaging portions and an annular groove, an operating shaft adapted to fit said hub, a slotted member attached to said operating shaft and adapted to receive said projections from said hub, a detent spring to coöperate with said annular groove in said hub, a sleeve having a projecting finger rotatably mounted upon said hub, an arm rigidly secured to said sleeve, pivotal connections between said rigidly secured arm and said sliding member; contact connections between said finger on said sleeve and said key releasing means, and contact connections between said finger and said dial resetting means, substantially as described.

3. In an adding machine of the class described, having a key releasing means and a dial resetting means, the combination of operating means comprising an operating arm having a slot at one extremity, a sliding member carrying a finger piece pivotally mounted upon a suitable stud rigidly secured to said slide, and extending through said slot in said arm, a hub rigidly secured to said arm having an annular groove, an operating shaft adapted to fit said hub, means for preventing the rotation of said hub upon said shaft, a detent spring to coöperate with said annular groove in said hub, a sleeve having a projecting finger rotatably mounted upon said hub, an arm rigidly secured to said sleeve, pivotal connections between said rigidly secured arm and said sliding member; contact connections between said finger on said sleeve and said key releasing means, and contact connections between said finger and said dial resetting means, substantially as described.

4. In an adding machine of the class described, having a key releasing means and a dial resetting means; the combination of operating means comprising an operating arm having a slot at one extremity, a sliding member carrying a finger piece pivotally mounted upon a suitable stud rigidly secured to said slide, and extending through said slot in said operating arm, a hub rigidly secured to said operating arm, an operating shaft adapted to fit said hub, means for preventing the rotation of said hub upon said shaft, means for retaining said hub upon said shaft, a sleeve having a projecting finger rotatably mounted upon said hub, an arm rigidly secured to said sleeve, pivotal connections between said arm and said sliding member; contact connections between said finger on said sleeve and said key releasing means; and contact connections between said finger and said dial resetting means, substantially as described.

5. In an adding machine of the class described having a key releasing means and a dial resetting means; the combination of operating means comprising an operating arm, a sliding member supported and guided by said operating arm, a hub rigidly secured to said operating arm, an operating shaft adapted to fit said hub, means for preventing the rotation of said hub upon said shaft, a sleeve having a projecting finger rotatably mounted upon said hub, an arm rigidly secured to said sleeve, pivotal connections between said rigidly secured arm and said sliding member; contact connections between said finger on said sleeve and said key releasing means; and contact connections between said finger and said dial resetting means, substantially as described.

6. In an adding machine of the class described, having a key releasing means, a dial resetting means, and dial actuating means; the combination of operating means comprising an operating arm, a sliding member supported and guided by said operating arm, a hub rigidly secured to said operating arm, reciprocatory means for actuating said dial actuating means, means for attaching said hub to said reciprocatory means, a sleeve having a projecting finger upon said hub, an arm rigidly secured to said sleeve, pivotal connections between said rigidly secured arm and said sliding member; contact connections between said finger on said sleeve and said key releasing means; and contact connections between said finger and said dial resetting means, substantially as described.

7. In an adding machine of the class described, having a key releasing means, a dial resetting means, and a dial actuating means; the combination of operating means comprising an operating arm, a sliding member supported and guided by said operating arm, a hub rigidly secured to said operating arm, reciprocatory means for actuating said dial actuating means, means for attaching said hub to said reciprocatory means, a lifting finger connected to said sliding member, contact connections between said finger and said key setting means, and contact connections between said finger and said dial resetting means, substantially as described.

8. In an adding machine of the class described, having a key releasing means, a dial resetting means and a dial actuating means; the combination of operating means comprising an operating arm, a sliding member supported and guided by said operating arm, reciprocatory means for actuating said dial actuating means, means for attaching said hub to said reciprocatory means, a lifting means actuated by said sliding member; contact connections between said lifting means and said key releasing means; and contact connections between said lifting means and said dial resetting means, substantially as described.

9. In an adding machine of the class described, having a key releasing means, a dial resetting means and a dial actuating means; the combination of operating means comprising an operating arm, a sliding member supported and guided by said operating arm, a hub rigidly secured to said operating arm, a reciprocatory means for actuating said dial actuating means, means for attaching said hub to said reciprocatory means, connections between said sliding member and said key releasing means, and connections between said sliding member and said dial resetting means, substantially as described.

10. In an adding machine of the class described, having a key releasing means, a dial resetting means, and a dial actuating means; the combination of operating means comprising an operating arm, a movable finger piece supported and guided by said operating arm, a reciprocatory means for actuating said dial actuating means, operative connections between said operating arm and said reciprocatory means, connections between said movable finger piece and said key releasing means, and connections between said movable finger piece and said dial resetting means, substantially as described.

11. In an adding machine of the class described, having a key releasing means, and a dial resetting means; the combination of operating means comprising an operating arm, a finger piece adapted to vibrate with said operating arm and to slide at an angle to such vibratory movement, connections between said finger piece and said key releasing means, and connections between said finger piece and said dial resetting means, substantially as described.

12. In an adding machine of the class described, having a key releasing means, the combination of operating means comprising an operating arm, a finger piece adapted to vibrate with said operating arm, and to move at an angle to such vibratory movement, and connections between said finger piece and said key releasing means, substantially as described.

13. In an adding machine of the class described, having a dial resetting means, the combination of operating means comprising an operating arm, a finger piece adapted to vibrate with said operating arm, and to move at an angle to such vibratory movement, and connections between said finger piece and said dial resetting means substantially as described.

14. In an adding machine of the class described, an operating handle having a movable finger piece, and suitable connections between said movable finger piece and the operating mechanism of said adding machine whereby any change in the radial distance from said finger piece to the axial point of said operating handle, releases the depressed keys of said adding machine, substantially as described.

15. In an adding machine of the class described, an operating handle having a movable finger piece, and suitable connections between said movable finger piece and the operating mechanism of said adding machine whereby change in the radial distance from said finger piece to the axial point of said operating handle, positions said operating mechanism of said adding machine, so that during the movement of said operating handle, the dials will be reset to the "0" point, substantially as described.

16. In an adding machine of the class described, an operating handle having a movable finger piece, and suitable connections between said movable finger piece and the operating mechanism of said adding machine whereby any movement of said operating handle, releases the depressed keys of the keyboard of said adding machine, substantially as described.

17. In an adding machine of the class described, an operating handle having a movable finger piece, and suitable connections between said movable finger piece and the operating mechanism of said adding machine whereby a movement of said finger piece independent of said operating handle, positions said operating mechanism of said adding machine so that during the movement of said operating handle, the dials will be reset to the "0" point, substantially as described.

18. In an adding machine of the class described having an operating handle and a spring for driving the same in one direction, the combination in a brake of means for braking the operating handle when driven by said spring, consisting of a brake wheel, the cup clutch member rigidly attached to said brake wheel, the pinion 19 carrying the inner clutch member 20, clutch rollers 24 between said clutch members, the sector 12 driven by said operating handle, said sector having thereon the gear teeth meshing with the teeth of said pinion 19, a brake carried by said sector and adapted to contact with the periphery of said brake wheel and retard the movement of said sector in one direction; and an auxiliary braking means for retarding the rotation of said rotary member during the operation of said operating handle, comprising the brake arm 26 carrying the brake shoe 32, and pivotally mounted at 25, the bent lever 27 mounted upon the forward extremity of said brake arm 26 and carrying the roller 28, the spring 31 between said bent arm 27 and said brake arm 26, and the abutting member 30 carried by said sector and adapted to abut said roller 28 during the movement of said sector, the parts coöperating for the purpose specified.

19. In an adding machine of the class described, having an operating handle and spring for driving the same in one direction, the combination of means for braking the movement of said operating handle when driven by said spring, consisting of a rotary member rigidly mounted upon a suitable shaft, a clutch cup rigidly secured to said rotary member, a pinion carrying a clutching member freely mounted upon said shaft, clutching rollers adapted to coöperate between said clutching member and said clutch cup, a sector driven by said operating handle having thereon gear teeth adapted to mesh with said pinion, an abutting member carried by said sector and adapted to contact with the periphery of said rotary member and limit the movement of said sector in one direction, and an auxiliary braking means for braking the movement of said rotary member during the operation of said operating handle, comprising a braking lever carrying a brake shoe, a yielding member mounted upon said braking lever, a spring for holding said yielding member in normal position, and a projection from said sector adapted to abut said yielding member during the movement of said sector in one direction, substantially as described.

20. In an adding machine of the class described, having an operating handle and a spring for driving the same in one direction, the combination of means for braking the movement of said operating handle when driven by said spring, consisting of a rotary member rigidly mounted upon a suitable shaft, a clutch cup rigidly secured to said rotary member, a pinion carrying a clutch member freely mounted upon said shaft, clutching rollers adapted to coöperate between said clutch cup and said clutch member, a sector driven by said operating handle having gear teeth adapted to mesh with said pinion means carried by said sector for braking the movement of said rotary member during the normal position of said sector, and an auxiliary braking means for braking the movement of said rotary member during the operation of said operating handle, comprising a braking lever, a yielding member mounted thereon, means for holding said yielding member in normal position, and means carried by said sector adapted to abut said yielding means during the movement of said sector in one direction, substantially as described.

21. In an adding machine of the class described, having an operating handle, the combination of means for braking the movement of said handle in one direction, consisting of a rotary member rigidly mounted upon a suitable shaft, a pinion freely mounted upon said shaft, a roller clutching means between said pinion and said rotary member, a sector driven by said operating handle having gear teeth adapted to mesh with said pinion; means carried by said sector for braking the movement of said rotary member when said sector is in normal position, and an auxiliary braking means for braking the movement of said rotary member during the operation of said operating handle, comprising a braking lever, a yielding member mounted thereon, means for holding said yielding member in normal position, and means carried by said sector adapted to abut said yielding means during the movement of said sector in one direction, substantially as described.

22. In an adding machine of the class described, having an operating means, the combination of means for braking the movement of said operating means in one direction consisting of a rotary member mounted in suitable bearings, a pinion rotatably mounted axially of said rotary member, a clutching means between said pinion and said rotary member, a sector driven by said operating means having gear teeth to mesh with said pinion, means carried by said sector for braking the movement of said rotary member when said sector is in normal position, and an auxiliary braking means for braking the movement of said rotary member during the operation of said operating means, comprising a braking member, a yielding member mounted thereon, and means carried by said sector adapted to abut said yielding means during the movement of said sector in one direction, substantially as described.

23. In an adding machine of the class described, having an operating means, the combination of means for braking the movement of said operating means in one direction, comprising a rotary member mounted in suitable bearings, a pinion mounted axially of said rotary member, a clutching means between said pinion and said rotary member, a sector driven by said operating means having gear teeth to mesh with said pinion, means carried by said sector for braking the movement of said rotary member when said sector is in normal position, and an auxiliary means for braking the movement of said rotary member during the operation of said operating means, substantially as described.

24. In an adding machine of the class described having an operating means, the combination of means for braking the movement of said operating means in one direction, consisting of a rotary member mounted in suitable bearings, a pinion mounted axially of said rotary member, a clutching means between said pinion and said rotary member, a sector driven by said operating means having teeth to mesh with said pinion, and means for braking the movement of said rotary member during the operation of said operating means, substantially as described.

25. In an adding machine of the class described, having an operating means, the combination of a rotary means for braking the movement of said operating means in one direction, and means for braking the movement of said rotary means during the movement of said operating means in the opposite direction, substantially as described.

26. In an adding machine of the class described having an operating means, the combination of a rotary means for braking the movement of said operating means in one direction, a gear sector for actuating said rotary means, and means carried by said sector for braking the movement of said rotary means when said sector is in normal position, substantially as described.

27. In an adding machine of the class described, having dial actuators, a swinging pick-up bail for restoring said dial actuators to normal positions; an operating handle for actuating said machine; means for imparting to said pick-up bail a movement which shall be accelerated at a point midway between the extremes, consisting of an operating sector pivotally mounted on the frame of said adding machine; a pitman pivotally mounted at the forward end to the upright arm 35; the upright arm 35 pivotally mounted upon the frame of said adding machine, and the other end of said pitman pivoted to said sector at a point approximately in line with the said pivotal point of said sector on said frame, and the said pivotal point of said pitman on said upright arm 35, the swinging support 39 for said pick-up bail and the link 40 pivotally connecting said upright arm 35 and said swinging support 39 for said pick-up bail, said pivotal points for said link 40 being so arranged that at the forward limit of movement of said upright arm 35, said pitman 34, and said sector, the said pivotal point of said link 40 upon said upright arm 35 will approach approximately a line between the pivotal point of said upright arm 35 on said frame, and the pivotal point of said link 40 on said swinging support for said pick-up bail, substantially as described.

28. In an adding machine of the class described having dial actuators, a reciprocating pick-up bail for restoring said dial actuators to normal positions, an operating handle for actuating said machine, means for imparting to said pick-up bail a movement which shall be accelerated approximately midway between the extremes of said movement, consisting of an actuating arm pivotally mounted on the frame of said adding machine, a pitman the forward end of which is pivotally connected to a swinging intermediate arm, and the other end of which is pivotally connected to said actuating arm at a point approximately in line with the pivotal point of said intermediate arm; a suitable swinging support for said reciprocating pick-up bail; a connecting link pivotally attached to said intermediate arm and to said support for said pick-up bail, said pivotal points being so arranged that at the forward limit of movement of said intermediate arm and said pitman, the pivotal point of said link upon said intermediate arm will approach approximately a line between the pivotal point of said link upon said support for said pick-up bail and the pivotal point of said swinging intermediate arm, substantially as described.

29. In an adding machine of the class described having dial actuators, and a reciprocating pick-up bail for restoring said dial actuators to normal positions, means for imparting to said pick-up bail a movement which shall be accelerated at a point approximately midway between the extremes of said movement, consisting of an actuating arm pivotally mounted on the frame of said adding machine, connections between said actuating arm and said pick-up bail comprising two series of pivotal link and lever connections, one portion of which operates approximately at dead centers during the first part of the movement of said actuating arm, and the other portion of which operates at approximately dead centers when said actuating arm reaches the end of its movement away from normal position, substantially as described.

30. In an adding machine of the class described, having dial actuators and a reciprocating pick-up bail for restoring said dial actuators to normal positions, means for imparting to said pick-up bail a movement which shall be accelerated midway between the extremes of said movement, consisting of a double system of link and pivotal connections with an intermediate lever between them.

31. In an adding machine of the class described, having dial actuators, means for engaging and disengaging said dials from said actuators, an engaging and disengaging lever connecting with said engaging and disengaging means, and an operating handle; means for altering the normal engaging and disengaging operations between said dials and said actuators consisting of a rotatable shaft 44. connections between said shaft and the said operating handle of the adding machine, a sliding member 47 adapted to abut said engaging and disengaging lever and prevent the disengaging movement of the same; means for retaining said sliding member 47 in depressed position until said operating handle starts in its return movement toward normal position, consisting of the roller 52 carried upon said sliding member 47, the secondary sector 14 rigid rotatable connections between said secondary sector and said operating handle, the plate 53 upon said sector having the bent over portion 53$^a$ in the form of an arc radial with the axis of said secondary sector, said bent over portion being adapted to pass over said roller 52 when the latter is depressed with said sliding member 47; the clip 55 with its bent over portion 55$^a$ so attached to said secondary sector that said bent over portion shall be radial with said bent over portion 53$^a$; the plate 54 pivotally mounted on said secondary sector 14 having the bent over portion 54$^a$ and adapted to complete the radial arc from 53$^a$ to 55$^a$ when said secondary sector swings forwardly over said roller 52, and to swing away from said 55$^a$ when said secondary sector starts back toward normal position; the contact pawl 61 pivotally mounted upon the secondary sector 14 normally adapted to actuate said engaging and disengaging lever, and means for holding said pawl 61 out of actuating relation with said engaging and disengaging lever during the depression of said sliding member 47, consisting of the pitman 62 having the projection 62′ adapted to move into position to contact with said pawl 61, and connections between said pitman 62 and said sliding member 47 consisting of the lever 64, the connecting link 65, the bell crank 66, and the pin 67, the parts co-acting for the purpose specified.

32. In an adding machine of the class described, having dial actuators, means for engaging and disengaging said dials from said actuators, an engaging and disengaging lever connected with said engaging and disengaging means and an operating handle; means for altering the normal engaging and disengaging operations between said dials and said actuators consisting of a sliding member actuated by said operating handle and adapted to abut said engaging and disengaging lever and prevent the engaging movement of the same; means for retaining said sliding member in depressed position until said handle starts upon its return movement consisting of a projection from said sliding member, a rocking sector, a track or way upon said sector adapted to pass over said projection from said sliding member when the latter is depressed, and means for causing an opening in said track or way through which said projection from said sliding member may pass to normal position when said operating handle starts toward normal position, comprising a track on said sector in three parts, the central one of which is pivotally mounted on said sector in such a manner that friction of said projection from said sliding member, when said sector moves in a direction away from normal, causes said pivoted portion to swing into position completing a way for said projection, and when said sector starts in its return movement said friction causes said pivoted section to swing in the opposite direction thereby rendering said way incomplete; and means for rendering the normal engaging means between said dials and said dial actuators inoperative after said sliding member has been depressed consisting of a movable bar bearing a projection adapted to move into such position as to render the normal engaging means between said dials and said dial actuators inoperative, and suitable connections between said movable bar and said operating handle, substantially as described.

33. In an adding machine having dial actuating mechanisms and mechanisms for engaging and disengaging said dials from said actuators, and an operating handle, means for holding said dials engaged with said actuators during the forward movement of said operating handle comprising a sector operated by said operating handle, a movable member having a projection, a track carried by said sector normally adapted to pass under said projection from said movable member, in sections one of which is pivotally mounted on said sector, said track being adapted to pass over said projection when the latter is depressed out of normal position, said pivotally mounted section being so positioned as to form a complete track or way for said projection during the movement of said sector in one direction, and to cause an opening in said track or way when said sector starts in the opposite direction; and suitable connections between said movable member and the engaging and disengaging mechanism of said adding machine, substantially as described.

34. In the resetting means of an adding machine of the class described, a vibratory member carrying a way or track in sections radial with the axial point of said vibrating member; a bearing member adapted to bear on one side of said way or track during the movement of said vibratory member in one direction, and means for causing an opening in said way or track through which said bearing member may pass as said vibratory member starts in the opposite direction, substantially as described.

35. In an adding machine of the class described, having an operating handle, an automatic key releasing mechanism operated during the movement of said handle, and a releasing arm or lever connecting with said key releasing means; the combination of a secondary sector actuated by said operating handle, a contact pawl pivotally mounted upon said secondary sector and having two engaging notches, said pivotal point upon said secondary sector being to one side of a line drawn through said either of said engaging notches on said contact pawl, and the axial point of said secondary sector; an upright arm pivotally mounted to the frame of said adding machine; suitable pins upon said upright arm adapted to be first engaged by one of said engaging notches of said contact pawl, and then by the other during the movement of said secondary sector toward normal position; and suitable connections between said upright arm and said releasing arm or lever, substantially as described.

36. In an adding machine of the class described, having key releasing means; an operating handle; connections between said releasing means and said handle comprising a vibratory arm; a by pass contact pawl pivotally mounted on said arm, having two engaging portions; a movable member; connections between said movable member and said releasing mechanism; projections from said movable member adapted to be engaged by said engaging portion on said pawl successively during the movement of said arm in one direction.

37. In an automatic key releasing means for adding machines of the class described; a movable member having a plurality of engaging portions; a by-pass actuating pawl therefor adapted to engage said engaging portions of said movable member successively, for the purpose specified.

In witness whereof, I have hereunto set my hand and seal in the presence of two witnesses.

GLENN J. BARRETT. [L. S.]

Witnesses:
L. G. GREENFIELD,
F. GERTRUDE TALLMAN.

---

Copies of this patent may be obtained for five cents each, by addressing the "Commissioner of Patents, Washington, D. C."